Feb. 1, 1966  G. E. ADAMS  3,232,561
CONTROL APPARATUS FOR SPACE CRAFT
Filed June 6, 1963  6 Sheets-Sheet 1

INVENTOR.
GUY E. ADAMS
BY
*Gordon Reed*
ATTORNEY

Feb. 1, 1966  G. E. ADAMS  3,232,561
CONTROL APPARATUS FOR SPACE CRAFT
Filed June 6, 1963  6 Sheets-Sheet 2

INVENTOR.
GUY E. ADAMS
BY
ATTORNEY

Feb. 1, 1966        G. E. ADAMS        3,232,561
CONTROL APPARATUS FOR SPACE CRAFT
Filed June 6, 1963        6 Sheets-Sheet 3

INVENTOR.
GUY E. ADAMS
BY
*Gordon Reed*
ATTORNEY

Feb. 1, 1966                 G. E. ADAMS                 3,232,561

CONTROL APPARATUS FOR SPACE CRAFT

Filed June 6, 1963                                  6 Sheets-Sheet 4

INVENTOR.
GUY E. ADAMS
BY
*Gordon Reed*
ATTORNEY

Feb. 1, 1966  G. E. ADAMS  3,232,561
CONTROL APPARATUS FOR SPACE CRAFT
Filed June 6, 1963  6 Sheets-Sheet 5

INVENTOR.
GUY E. ADAMS
BY
Gordon Reed
ATTORNEY

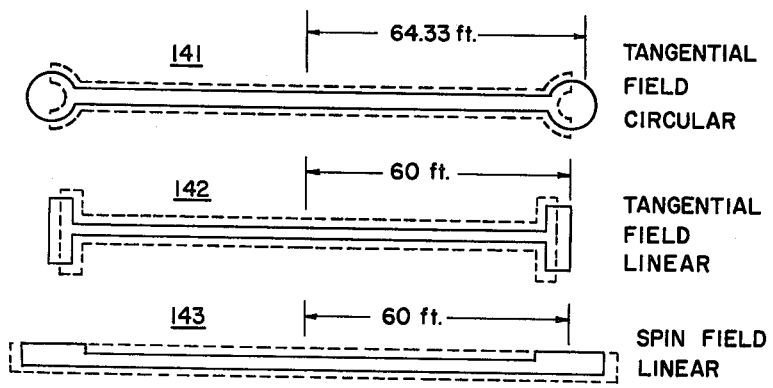
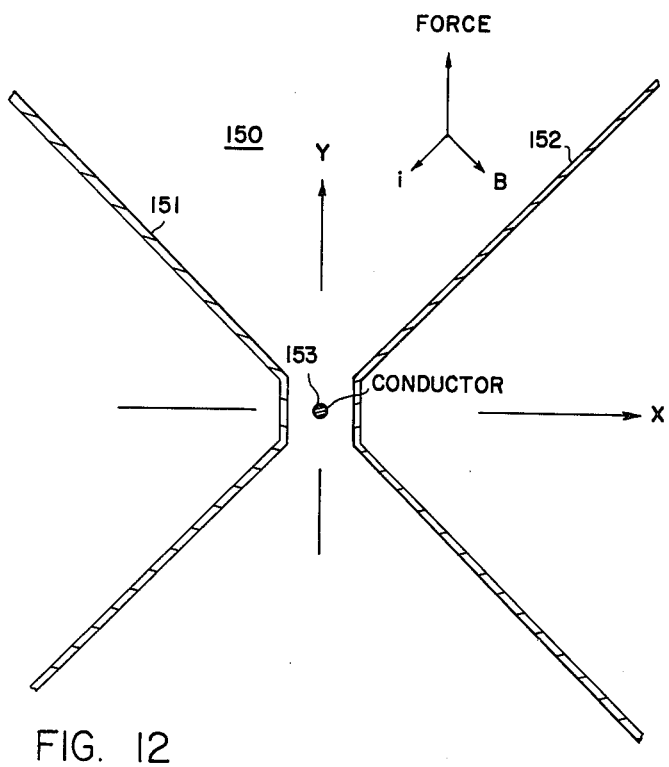

United States Patent Office 3,232,561
Patented Feb. 1, 1966

3,232,561
CONTROL APPARATUS FOR SPACE CRAFT
Guy E. Adams, Golden Valley, Minn., assignor to
Honeywell Inc., a corporation of Delaware
Filed June 6, 1963, Ser. No. 286,119
25 Claims. (Cl. 244—1)

The present invention relates broadly to attitude control systems for vehicles and has been applied herein to attitude control systems for earth orbiting type space vehicles. The vehicle may be viewed as a toroidal type having an outer hull which is connected to a central hub by means of spokes or other support members. The vehicle may include a parabolic reflector or solar cells to collect the sun's rays for power generation for use on the vehicle.

If such vehicle is manned, it may be desirable to produce an artificial gravity environment for the occupants to which purpose the entire vehicle is given a constant angular rate about the axis of symmetry. Further in order to maintain the alignment of the axis of symmetry for example with respect to a desired orientation such as the alignment of the spin axis with respect to a line of sight to the sun for purposes of power generation and other purposes, an attitude control system is provided. Since objects or men moving within the vehicle and also external forces due to solar radiation pressure, atmospheric drag, gravitational gradient, etc., will create disturbance torques on the vehicle, the function of the attitude control will be to sense deviations of the spin axis from the desired orientation to the sun and provide correcting torques in order to hold the error within acceptable bounds.

While the earth's magnetic field has previously been used by an earth orbiting vehicle during attitude control of such vehicle, an object of the present invention is to provide improved means for attitude control of a space vehicle utilizing the earth's magnetic field.

A further object of the invention is to provide attitude control of a space vehicle utilizing the earth's magnetic field wherein a source of current on the vehicle energizes conductors which set up a magnetic field that interacts with the earth's magnetic field.

A further object of the invention is to provide attitude control for an orbiting space vehicle wherein an electrical conductor on such vehicle is energized from a source of current upon change from a desired attitude of said craft to develop a magnetic field interacting with the earth's magnetic field, with switching means controlled by the direction of the earth's magnetic field, determining the direction of current through such conductor.

A further object of the invention is to provide a low thrust level to compensate normal orbiting decay using energy derived from the sun or other sources.

A further object of the invention is to provide "quiet" vehicle attitude control thrust and hovering control for a vehicle to offset disturbances for example as those caused by ocean currents in undersea neutral buoyancy vehicles or other fluid supported vehicles and to effect changes in geographical location for various undersea surveillance and communication applications.

A further object of the invention is to provide improved means for controlling the spin rate of the space vehicle by means interacting with the earth's magnetic field.

A further object of the invention is to control the spin rate of the orbiting space vehicle by the utilization of spin torque obtained from induction due to orbit velocity of the vehicle through the earth's field.

It is a further object of this invention to provide improved means coacting with the earth's magnetic field to control the spin rate of a space vehicle about an axis by the interchange of the energy due to the spinning of the craft about one of its own axes with the energy due to the orbital velocity of such vehicle in space.

It is a further object of the invention to control the spin rate of a space vehicle by the means of a torquer on said vehicle energized from D.C. voltage providing a magnetic field interacting with the earth's magnetic field.

It is a further object of this invention to provide an improved torquer which coacts with the earth's magnetic field for controlling spin rate of the vehicle.

It is a further object of this invention to provide improved torquers which control the vehicle's attitude by interaction with the earth's magnetic field.

The above and other objects of the invention will become more apparent from the following detailed description of exemplary structure embodying the invention and from the accompanying drawings, in which:

FIGURE 11 shows three types of spin torquer configurations for a vehicle as in FIGURE 10; and FIGURE 12 shows one configuration of a flux multiplier.

According to the invention, there is provided for attitude control on an earth orbiting space vehicle current conducting torquers which provide a magnetic field coacting or interacting with the magnetic field of the earth. For controlling vehicle attitude, such torquer current is controlled by a sensing device providing an error signal upon departure of the spin axis of the orbiting vehicle from a desired orientation. The circuit as thus controlled reorients the attitude of the vehicle until the desired orientation of the spin axis is within limits required.

There is also provided for such spinning orbiting vehicles a spin velocity control energized either from a source of direct current on the vehicle for reacting with the earth's magnetic field to correct velocity rate, or alternatively energized by induction means which latter method interchanges the spin velocity energy of the vehicle with the orbital velocity energy of the vehicle to maintain a desired spin rate.

Figure 1:
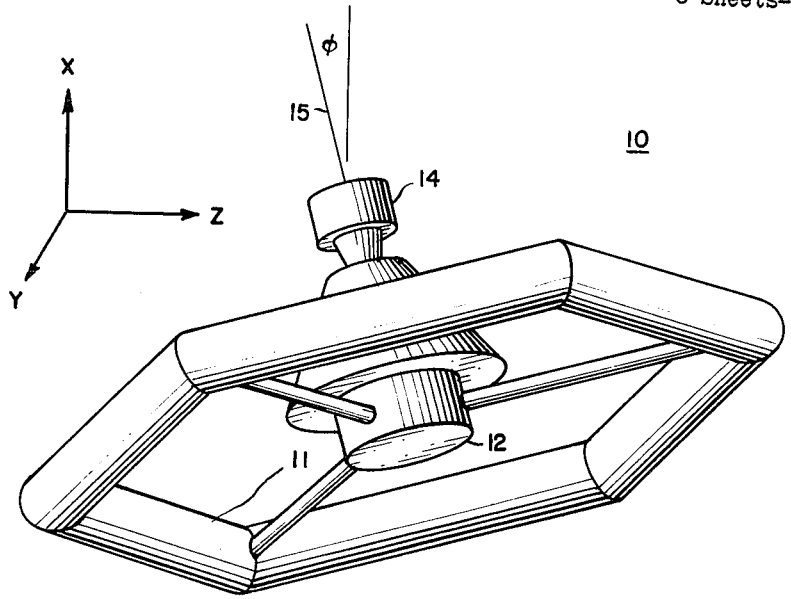
FIGURE 1 is an earth orbiting space vehicle having a hexagonal configuration.

Referring to FIGURE 1, an earth orbiting space vehicle 10 of generally a hexagonal toroidal configuration has an outer portion 11 made up of independent modules which are joined by spoke members to a central hub 12. The central hub supports a member 14 sensitive to incident sunlight which impinges thereon at an angle $\theta$ with respect to the spin axis 15 of the space vehicle 10. The angle $\theta$ is an indication of the deviation of the spin axis from a desired orientation in this case the sunshine and a signal in accordance therewith is used for subsequent vehicle attitude control purposes. The direction of the spin axis 15 relative to the direction of the incident rays of the sun is controlled utilizing the signal by changing the attitude of the vehicle about two axes Y, Z respectively perpendicular to axis 15 and to themselves and generally contained in the plane of the vehicle defined by the portion 11 and central hub 12. Since the vehicle may be used for orbiting the earth in space, it traverses the earth's magnetic field which is used in attitude stabilization of the craft in a manner to be described. While attitude stabilization thus is provided, damping of attitude changes is included.

Further, since the vehicle 10 may be of the manned type, it may be desirable to artificially create gravity on the vehicle by controlling a desired rotation rate about the spin axis 15 and means will be subsequently described for interacting with the earth's magnetic field to control such spin rate.

Figure 2:
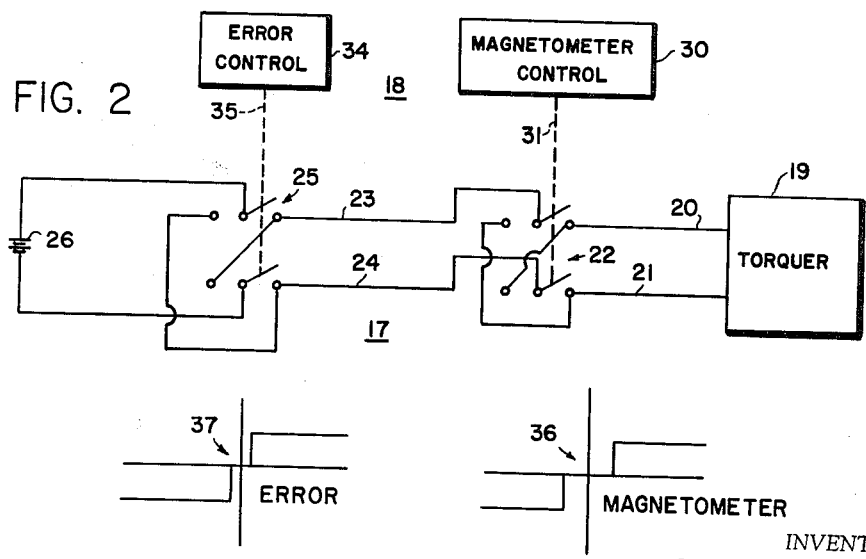
FIGURE 2 is a block diagram of a basic attitude controller for one axis of the vehicle.

In FIGURE 2, a basic attitude controller 18 related to one axis, Z, of the vehicle, for example, includes a torquer 19 having input conductors 20, 21 connected through a double pole, double throw switch 22, conductors 23, 24, a second double pole, double throw switch 25 to a source of D.C. current 26. Double pole, double throw switch 22 is operated from a magnetometer control 30 through suitable operating means 31, and double pole, double throw switch 25 is operated from an error control 34 through a suitable operating means 35. Magnetometers having a mechanical or electrical output are well known, see for example "The Airborne Magnetometer" in the Scientific American, June 1961, by Homer Jensen.

The torque provided by the magnetic torquer 19 which reacts with the earth's magnetic field depends on orientation in the earth's magnetic field, magnetic field strength, and torquing current supplied through conductors 20, 21. Only the earth's magnetic field component along the sensitive vehicle axis provides torque. In addition there is cross-coupling between Z and Y axis torquers, that is, the Z torquer causes a Y torque component along with the desired Z torque.

Magnetometer control 30 includes a magnetometer mounted to sense the earth's Z axis magnetic field component. In the system shown in FIGURE 2, the control 30 with a mechanical output 31 controls the circuit energizing position of the double pole, double throw switch 22, the energizing position of the switch depending on the sense of the magnetic field affecting the magnetometer output. Since electrical power should be conserved as much as possible on the vehicle, the magnetometer in the ON-OFF system as in FIGURE 2 should introduce a threshold, see graphical illustration 36, so that the double pole, double throw switch 22 remains open until the magnetic field strength exceeds a certain minimum.

The error control 34 includes various sources of error signals such as that from the sun sensor as well as rate gyros on the vehicle. The error control operates switch 25 in either one or the other direction, from a noncircuit energizing position depending on the polarity of the error signal, when the error reaches or exceeds a small threshold level, see graphical illustration 37.

It will be appreciated that FIGURE 2 illustrates the controller as applied to but one axis of the space vehicle and that a second similar arrangement is provided for the other or Y axis. In other words, the Y and Z axes each include a controller 18 as shown in FIGURE 2.

Figure 3:
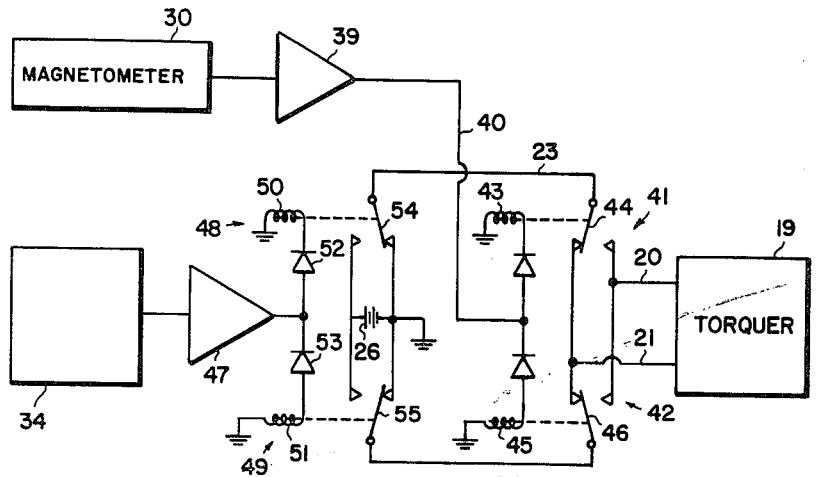
FIGURE 3 is an electrical schematic of an ON-OFF attitude controller similar to that of FIGURE 2.

FIGURE 3 shows an ON-OFF controller utilizing a relay form of circuit instead of double pole, double throw switches. In FIGURE 2, as stated, torquer 19 receives current from conductors 20, 21 from a source of D.C. current 26. Double pole, double throw switch 22 in FIGURE 2 is replaced by two operable relays 41, 42 having operating windings 43, 45 respectively operating relay arms 44, 46 from a normal out position as shown. Windings 43, 45 are energized from an output of conductor 40 from amplifier 39 that receives an electrical control signal from magnetometer 30 in accordance with the direction of the magnetic field of the earth. The threshold of amplifier 39 is such that the field strength must attain a predetermined value, see illustration 36, FIGURE 2, before either relay operating winding 43 or 45 is energized. If the magnetic field direction is of one sense or nature, winding 43 is energized and if of opposite nature, winding 45 is energized.

Similarly double pole, double throw switch 25, FIGURE 2, is replaced by a pair of relays 48, 49 having operating windings 50, 51. These windings are energized through respective diodes 52, 53 from the output of an amplifier 47 receiving an electrical signal from error control 34. Relay winding 50 is energized say with positive output from amplifier 47 to operate its arm 54 from its normal position as shown whereas winding 51 is energized from negative output from amplifier 47 to move arm 55 from its relay out position shown. Thus the combination of the outputs from amplifiers 39 and 47 determines the direction of current in the torquer 19.

Reviewing FIGURE 3, the gain of amplifier 47 is set to close relay 48 or 49 at the predetermined error threshold. Relay 48 closes with positive output from amplifier 47; relay 49 closes with negative output of amplifier 47. Amplifier 39 is set to close relay 41 or 42 when the electrical output of magnetometer control 30 reaches a predetermined level. Relay 41 closes with positive output of amplifier 39, and relay 42 closes with negative output of amplifier 39. The combination of outputs from amplifiers 47, 39, that is, positive or negative polarities, determines the direction of current in the torquer 19. In other words, current flow is positive in the torquer if the outputs of amplifiers 47, 39 have the same sign; otherwise it is negative. In other words conductor 20 would be positive relative to conductor 21. This condition applies only for signals above the two thresholds of the two amplifiers. Thus the direction of current through the torquer 19 depends upon the polarity of the error signal sensed by error control 34 and the direction of the earth's magnetic field sensed by magnetometer 30. The current through torquer 19 sets up a magnetic field which reacts with the earth's magnetic field, which for attitude stabilization controls the attitude of the space vehicle.

Figure 4:
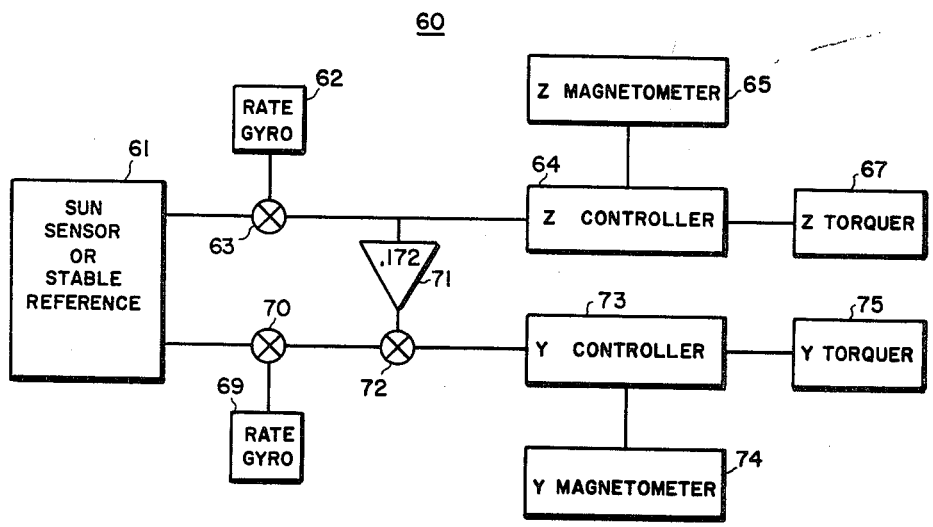
FIGURE 4 is a block diagram of a two axis attitude control system for the space vehicle.

FIGURE 4 shows a configuration of a two axis attitude control system 60 for the space vehicle for maintaining the spin axis thereof oriented as desired, in this case, in the direction of the line of sight from the vehicle to the sun. For such attitude stabilization, torque is provided about the Y—Z axes of the craft. Error signals detected by a sun sensor 61, or other suitable reference, in one instance are combined with Z axis angular rate signals, which are a function of the deviation from a normal position of the vehicle, sensed by a rate gyro 62, in a summing device 63, having its output supplied through a Z axis controller to the Z axis torquer 67. The Z controller 64 is controlled by the magnetometer 65. The Z controller, FIGURE 4, may take the configuration of the ON-OFF controller shown in FIGURE 3.

Sun sensor signals from sensing device 61 with respect to vehicle attitude error about the Y axis are supplied to a summing device 70 where they are combined with angular rates of the vehicle about the Y axis sensed by rate gyro 69. The output from summing device 70 is supplied to Y axis controller 73 which energizes Y torquer 75. The Y controller is jointly controlled by the output from summing device 70 and the Y magnetometer 74 and also may take the configuration of the arrangement in FIGURE 3. A cross coupling from the Z axis control to the Y axis control is supplied through amplifier 71 with the gain as indicated and is intended to compensate the Y torquer components produced by the Z axis torquer of the configuration of FIGURE 9. If cross coupling compensation were not used, a compensating torque would be induced in the Y controller as a result of the Y axis response due to Z torquing signals.

With respect to the sensors, both the sun sensor 61 and the rate gyros 62, 69 for providing electrical signals are well known in the art and details thereof do not constitute applicant's invention.

Continuing to the vehicle spin rate control and considering it broadly, spin torque can be obtained from either D.C. power or voltage induction due to orbit velocity of the vehicle through the earth's magnetic field. A single spin torquer would provide sinusoidally varying torque resulting from the attitude in the earth's magnetic field; two or three torquers arranged symmetrically would be the preferable control.

Spin torque can also be obtained from a single torquer control for a battery powered torquer and would be generally similar to that control shown in FIGURE 2, assuming ON-OFF operation. In such case the error control would sense the rate of spin of the vehicle about its own axis which would be compared with a referenced spin rate and the error control would operate a double pole, double throw switch in one or the other direction depending upon the difference between the rate sensed and the spin rate selected. The torquer would be of the type suitable for varying spin rate of the craft.

Figure 5:
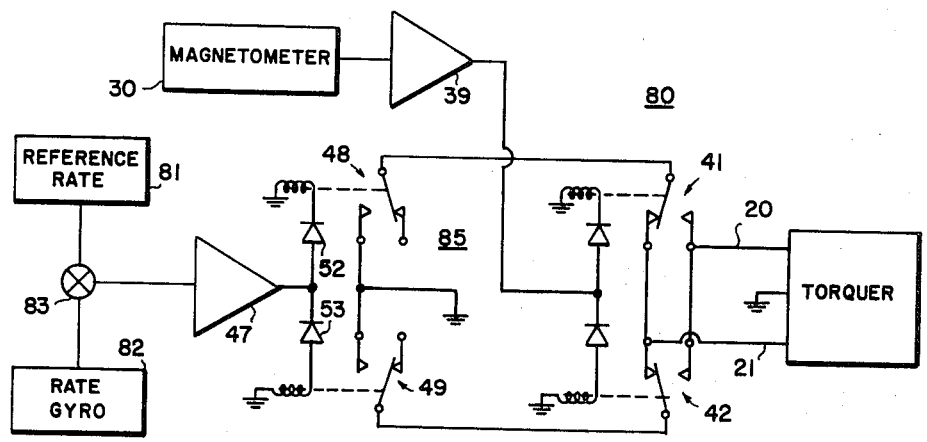
FIGURE 5 is an electrical schematic of an ON-OFF spin control or vehicle spin rate control utilizing induction torquing.

Instead of a battery powered torquer for controlling spin velocity, a single torque control for induction torquing as shown in FIGURE 5 may be provided. In controlling the spin rate of the vehicle, by orbit velocity induction, there will be an interchange between the angular momentum of the vehicle about its own axis and its orbital momentum about the earth. In other words to increase the spin rate of the craft about its own axis there will be a corresponding loss in orbital velocity of the vehicle. This induction torquing arrangement requires the selection of the proper torque section at any given time or position of rotation. In this system, torquer sections are alternately shorted as the satellite spins about its own axis. In FIGURE 5, an induction type torquing arrangement 80 for spin control of the vehicle 10 includes a selected angular rate reference device 81 and a vehicle spin rate responsive gyro 82 which have their outputs in opposing relation summed at summer 83. Included in this arrangement is a magnetometer 30 and amplifier 39 which as in FIGURE 3 control two relays 41, 42 of a switching arrangement 85 whereas the output from the summer 83 is applied through an amplifier 47 to also control two relays 48, 49 similarly shown in FIGURE 3. The distinction between FIGURE 3 and FIGURE 5 is that the battery source 26 is omitted in the latter and the torquer sections are alternately shorted through the operation of the above relays.

Figure 6:
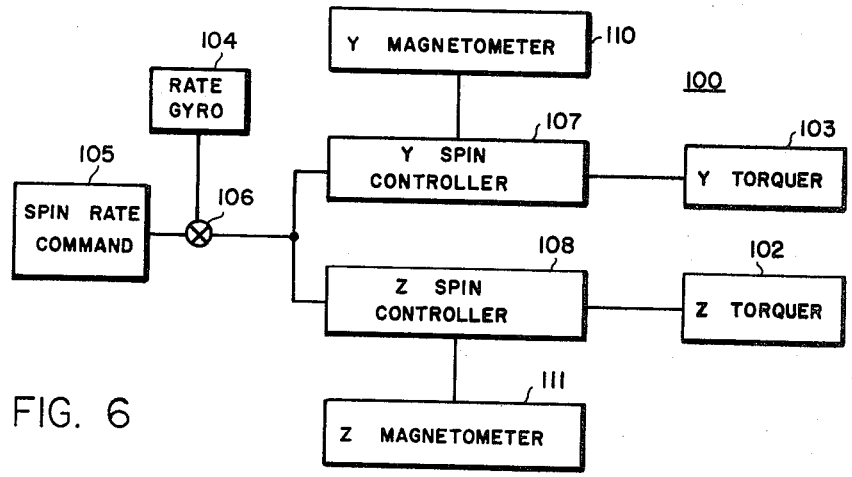
FIGURE 6 is a block diagram of a vehicle spin rate controller utilizing two spin torquers.

An arrangement of a spin control system 100 with two spin torquers is shown in FIGURE 6. One torquer 102 is aligned with the Z axis and another torquer 103 is aligned with the Y axis. In FIGURE 6, a spin rate command device 105 has its electrical output combined with an electrical output in accordance with the craft spin rate, as sensed by rate gyro 104, at summer 106, and the output from summer 106 is distributed in parallel to the Y spin controller 107 and the Z spin controller 108. The outputs from the controllers are supplied to the Y torquer 103 in one case and to the Z torquer 102 in the other and, the torquers may be of the type shown in FIGURE 9. The Y spin controller is controlled by the magnetometer 110 and the Z spin controller 108 is controlled by the Z magnetometer 111. Each torquer 103, 102 provides essentially a torque-time function similar to a rectified sine wave, this is equivalent over a spin period to a constant component, a fundamental and all harmonics of the fundamental spin frequency. Two torquers provide twice the average torque of one and even harmonic components cancel.

The component of magnetic field along a particular satellite axis varies sinusoidally as the vehicle spins. Since spin torquers are switched ON or OFF in synchronism with vehicle spin rotation to produce torque in one direction and since torque with battery torquing is sinusoidal, the torque produced by one torquer is the same as a rectified sine wave. The torque from two torquers on opposite sides of the vehicle then would be caused by the alternate opening and closing of the switches and would be comparable to a full wave rectified sine wave. Fourier series analysis accounts for the average torques produced (D.C. as well as the harmonics). All odd harmonics occur with half wave rectification. Only evens occur with full wave, assuming of course equal torque producing capability.

Typical magnetic field torquers will now be considered. It will be appreciated firstly that with the space vehicle traversing the earth's magnetic field the torque on the vehicle having conductors in a closed path will consist of (1) a component due to an applied voltage or current assumed to be from a battery, and (2) an induction component caused by the orbital velocity through the magnetic field. The force and thus the torque for (1) can have either a positive or negative sense depending upon the direction of the current and the direction of the component of the magnetic field of the earth. The induction component (2) due to the induced voltage and current in the closed path always produces a force opposing the motion through the magnetic field. However, in the space vehicle, assuming conductors are available at various locations around the periphery of the vehicle, the induction torque can have either a positive or a negative direction.

Figure 7:
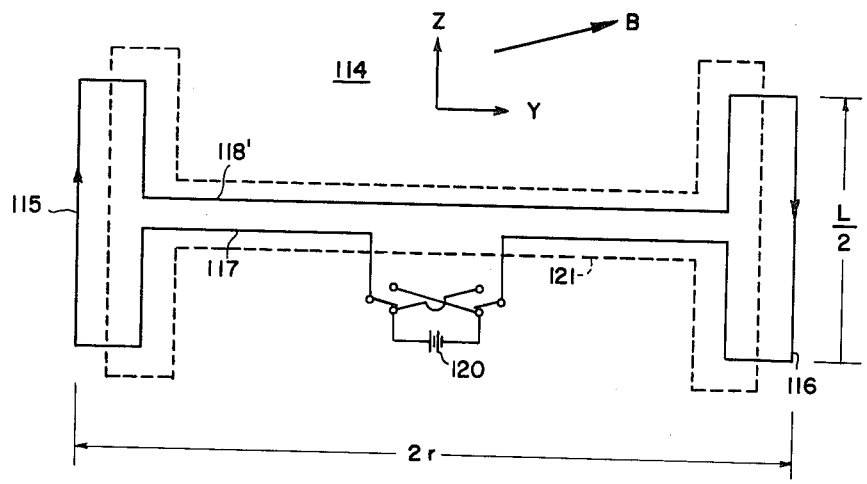
FIGURE 7 shows a battery energized torquer configuration and as illustrated used for attitude control.

FIGURE 7 shows a battery energized type torquer 114. Torquer 114 comprises a number of turns 115, 116 at each end respectively forming two generally rectangular elements connected by a single pair of conductors 117, 118 forming a somewhat slender rectangle normal to the first two rectangles. Battery current from a source 120 (consisting of a battery and a double pole, double throw switch) would be supplied somewhere in the closed circuit preferably to conductors 117, 118. With the switch polarity and flux direction shown, an upward force would be produced on the right hand conductor 116 and a downward force would be produced on the left hand conductor 115 causing torque in the negative sense about the Z axis.

The magnetic shielding 121 as shown serves to isolate areas of the torquer from the earth's magnetic field. The induction component around the closed circuit is zero, and consequently only the battery current causes torque. The torque occurs about an axis parallel to the current flow in conductors 115, 116.

Figure 8:
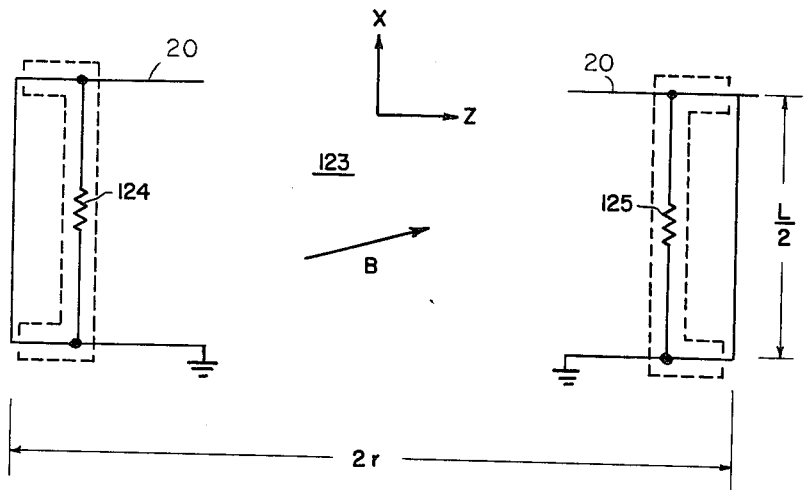
FIGURE 8 shows a form of torquer used with orbit velocity induction in an arrangement as shown in FIGURE 5.

FIGURE 8 shows, by way of illustration broadly, a torquer 123 used for orbit velocity induction. The orbit velocity induction torquer 123 of FIGURE 8 has two alternately closed normally open circuit windings having, as a consequence of a closing, two different resistances, as resistances 124, 125, one in each winding or section. The two sections are not electrically connected. In FIGURES 7 and 8, $r$=moment arm, L=conductor length in the direction of current flow. The torquer produces torque affecting the spin rate and orbit velocity only if the two resistances are different as when the circuit through one section is closed with the circuit through the other section open. This results because torque affecting the spin rate is proportional to the difference of the two currents; since induced voltages due to orbital velocity are equal, the two different resistances result in different currents. The torquer control, as in FIGURE 5, would short circuit one torquer section say through conductor 20 and open circuit the other connected with conductor 21 so that torque affecting the spin rate would be produced in a positive or negative sense as needed to either increase or decrease spin rate. Assuming the vehicle velocity in earth orbit at about 23,400 feet per second relative to the earth's magnetic field, the induction torque from the orbital velocity of the vehicle is much greater than that from the vehicle spin rate say of four r.p.m. so that significantly the spin rate induction component can be neglected. It can be shown that relatively large induction voltages or currents can be obtained in the earth's magnetic field of the order of 0.25 to 0.5 gauss, typical of earth's field strength.

It will be appreciated in this magnetic torquing concept that where torque is supplied from interaction with the earth's field due to an applied voltage to the torquer windings the vehicle change in energy is supplied from the battery, whereas in induction torquing as in FIGURE 8, the change in the vehicle angular relation respecting any of its three coordinate axes is effected at the expense of change in orbital velocity of the vehicle.

Figure 9:
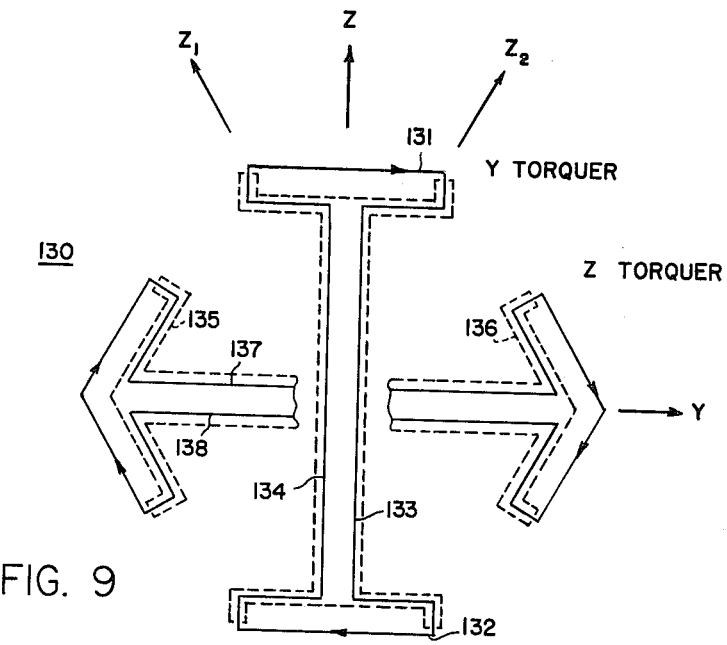
FIGURE 9 is an electrical schematic of a D.C. applied torquer used in a system arrangement as shown in FIGURE 4.

Progressing from the above general consideration of various types of energization of the torquers and considering the space vehicle of hexagonal configuration, three sets of torquers, assuming control about three axes, are needed. FIGURE 9 shows one schematic layout for the Y and Z axis torquer configurations. The Y axis torquer consists of the two end sections 131, 132 with about seven turns of conductor at each end. The two sections 131, 132 are connected by a pair of conductors 133, 134 all connected to a D.C. supply (not shown) with arrowheads showing current flow direction in the end sections. The arrangement of the Z torquer is in accordance with the hexagonal configuration of the vehicle. The Z axis torquer consists of the two sections 135, 136 with about seven turns of conductor at each end connected by a conductor pair 137, 138, all energized from a D.C. source. The layout of the Z torquer because of the particular configuration results in a small torque component about the Y axis in addition to the torque about the Z axis. The Y torquers coact with the component of the earth's magnetic field parallel to the Z axis of the vehicle. Because of the angularity in configuration of the Z torquer, it is responsive not only to the Y component of the earth's magnetic field but also to the Z component of the earth's magnetic field, both components being indicated by arrows y, z.

Merely to show comparative length, and assuming each side of the hexagonal figure of about 75 foot length, element lengths of the Y and Z torquers are chosen so that the two torquers have about equal torque-current scale factors. Thus it was found that 75 feet for the Y torquer and 88 feet for the Z torquer provide equal torques. Also the Y axis torque from the Z axis torquer is 0.172 times the Z axis torque. This undesired torque is compensated in the control system.

Figure 10:
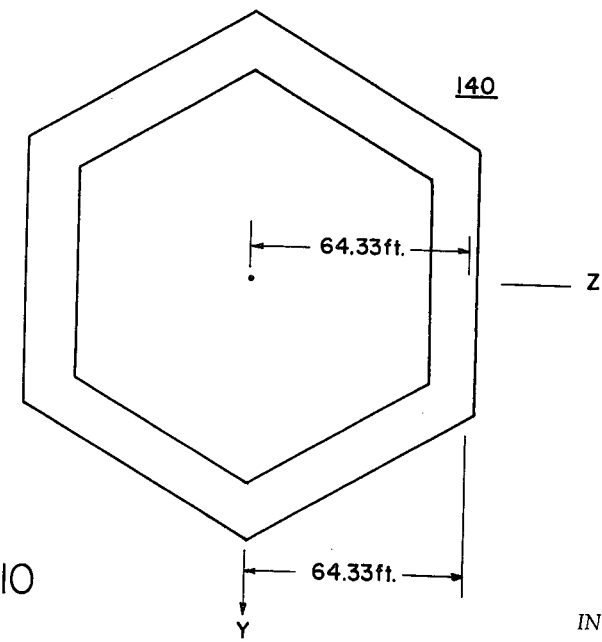
FIGURE 10 shows the vehicle and the location of spin torquers thereon.

FIGURE 10 shows the general plan of the hexagonal earth orbiting space vehicle showing the dimensions thereof and a mean moment arm of 64.33 feet of the force acting on a torquer. In connection with the vehicle of FIGURE 10, FIGURE 11 shows several possible layouts, 141, 142, 143, for battery energized spin torquers. These torquers are three in number and the upper two types are referred to as the circular type. The circular type spin torquers 141, 142 consist of a number of turns of conductor wound around or circumscribing the space vehicle at the diameter thereof as indicated. The conductor elements or shielding for the circular torquers can be suitably arranged to provide torque affecting spin rate from the earth field components lying in the Y—Z plane. This arrangement is called a tangential field torquer. Layout 141 has a mean moment arm of 64.33 feet for its torquer; layout 142 has a 60 foot moment arm for its torquer.

The linear type 143 is similar to previous configurations discussed and consists of linear conductors along the satellite diameter. The linear type torquer is arranged to interact with the fields parallel to the vehicle spin axis and is thus called a spin field torquer. Its torquer has a 60 foot moment arm.

The tangential torquers 141, 142 are preferred over the linear type torquer 143 since they produce torque only about the spin axis of the vehicle. The linear spin field type 143 also produces undesired Y or Z axis torques by interaction with B field components in the Y—Z plane.

The above battery energized type spin torquers could also be used for induction field torquing by removing the connecting pair of conductors, in other words, using the equivalent circuit as shown in FIGURE 8. In this event, one torquer section or the other is used at any given time producing torque by virtue of the drag force created.

The torquers could be used in sets of two or three arranged symmetrically in the Y—Z plane. This would provide a more uniform torque output as a function of spin angle of the vehicle.

FIGURE 12 is an illustration of an earth's magnetic field flux mutiplier. Magnetic flux can be guided and concentrated in a high permeability material. A flux concentrating magnetic structure is used to concentrate the earth's magnetic flux in the region of the magnetic torquer. The net result is an increase in torquing capability. FIGURE 12 illustrates a possible flux multiplier 150 in cross section. Flux in the X direction or direction of the craft spin axis entering a left hand open section 151 is gathered by the sides of the structure and concentrated in the region of conductor 153. The flux passes out from the right hand section 152. The ends of the flux multipliers would be closed, using a preferred material, to preserve flux concentrating capability at the ends.

*Operation*

Reviewing the operation of the torquers, it will be recalled that it was stated that the effect on induction of orbital velocity about the earth of the space vehicle is much greater than this effect from the vehicle spin rate so that the spin rate induction component can be neglected. Considering a battery energized torquer as shown in FIGURE 7 but oriented 90 degrees into the XY plane firstly, and recalling the left hand motor rule for finding the direction of movement of the vehicle about its X axis wherein in pointing the forefinger of the left hand in the direction of the flux, the middle finger in the direction of the impressed voltage or current, the thumb will point in the direction of movement or torque. Thus assuming the magnetic field, B, to be in the direction shown and with battery current in windings 115, 116 in the direction of the arrows, the resultant direction of torque affecting motion of the windings 115, 116 can be determined. From the left hand motor rule, it will appear that the windings 115, due to the torque, would move away from the observer whereas the windings 116 would move toward the observer.

In terms of automatic spin rate control and referring to FIGURE 6 wherein two crossed tangential spin torquers as in FIGURE 11 are utilized, the spin rate error from summing device 106 through the Y spin controller and the Z spin controller jointly would control the application of current to the Y torquer 103 and the Z torquer 102. The magnetometers 110, 111 provide a commutating action in that, similarly to D.C. generator and motor commutators, they control the direction of current flow through the torquer windings in accordance with the direction of the earth's magnetic field relative to the vehicle. The summing device 106 has an output which indicates the requirement for increase or decrease in spin rate.

With respect to the induction torquers of FIGURE 8, we again assume that the vehicle earth orbit velocity is away from the observer and the magnetic field B is as shown by the vector. Applying the right hand rule for induced voltage using the thumb, forefinger and middle finger, rather than the left hand rule, to the circuit including resistor 124, the direction of the induced voltage or current is downward in the unshielded wire. The magnetic field about the wire due to this induced current is in such a direction that when it interacts with the earth's magnetic field, the wire tends to move toward the observer in the figure. Viewed from above or in plan this would cause the torquer and thus the space vehicle to rotate in a counterclockwise direction. This movement about the spin axis X is obtained at the expense of a reduction in the orbiting velocity of the vehicle. It will be realized that but one of the circuits indicated respectively by resistors 124, 125 is closed, the other remaining open. It will also be appreciated that while the change in vehicle spin rate achieved by the arrangement in FIGURE 8 also involves change in the vehicle orbiting velocity no such interchange of orbital velocity and spin velocity results from the battery operated arrangement in FIGURE 7.

With respect to the induction type torquer of FIGURE 8 as implemented in the system of FIGURE 5, it will be appreciated that one magnetometer 30, FIGURE 5, closes the circuit to enable induction as the vehicle traverses the earth's field to energize the winding including resistor 124 while the circuit to the winding including resistor 125 is left open but after 180° of spin rotation, the reverse is true in that the circuit including resistor 125 is closed by the magnetometer whereas the circuit including resistor 124 is opened. It should be appreciated that resistors 124 and 125 represent merely total circuit resistance. This switching or commutating action is due to the fact that the magnetometer, being oriented to the vehicle frame, senses alternately positive and negative fields and thus operates the relays alternately positively and negatively as the vehicle rotates thus effecting the switching action.

Also with respect to FIGURE 8, if the circuit which includes the resistor 125 is closed, whereas the circuit which includes resistor 124 is opened, the resultant direction of current in the unshielded wire in the circuit including resistor 125 from the right hand rule is also downward. The resultant force on the torquer 123 due to the earth's magnetic field B and the magnetic field of the unshielded wire due to the flow of current tends to move the winding toward the observer. This rotation is in opposite direction from that caused by the effect previously considered when the current flows through the winding including resistor 124. Consequently if the output from amplifier 47, FIGURE 5, which includes induction torquing, be of one phase or polarity, it also determines which winding, either that comprising resistor 124 or that comprising resistor 125, FIGURE 8, will be energized. In other words the spin control using induction torquing of FIGURE 5 can cause either an increase or a decrease in the spin rate in accordance with the referenced rate from source 81, FIGURE 5.

In a similar manner the Y and Z axis torquers of FIGURE 9 when used in a system of FIGURE 4 are energized by a current, which has its direction controlled by the magnetometer 65 and the summer 63 with respect to the Z torquer 67, and by the output of summer 72 and magnetometer 74 with respect to the Y axis torquer 75.

It will be appreciated that the sun sensor may be of the electro-optical or light sensitive type which provides a current or voltage output in accordance with the departure of the direction of the spin axis from the desired orientation such as angular deviation from the direction or line of sight to the sun. The sun sensor may be a system consisting of solar detectors, optics, and processing electronics, which yields an electronic signal which indicates the presence of the sun in the field of view, and the angle between the sun and the optical axis. Such sensor provides an output voltage or current which is linear over a limited angle of deviation of the spin axis from line of sight. Such sensor would be mounted on the spin axis 15 of the vehicle.

It will now be apparent that I have provided a novel three axis control system for a space vehicle utilizing the earth's magnetic field for controlling the spin rate of the craft about one axis and the orientation or attitude of the craft about the two axes respectively perpendicular and perpendicular to the first axis. While the invention comprehends various differences in the specific structure herein illustrated, the scope of the invention is delineated by the appended claims.

What is claimed is:

1. In an attitude control apparatus for a tiltable device having means detecting a magnetic field and means detecting a function of the error of tilt of the device and means responsive to both detecting means supplying an electrical current, a torque motor winding receiving said current and having a configuration represented by a conductor loop of rectangular shape having a pair of opposed sides compressed or moved toward a center line of the rectangle whereby to form one slender rectangle and two end rectangles perpendicular to the slender rectangle and whereby substantially two sides of each of the three rectangles comprise conductors, means for shielding both conductors in the slender rectangle and one conductor in each of the end rectangles, the current passing in opposite directions through the remaining conductor in each end rectangle.

2. In an attitude stabilizing apparatus for an earth orbiting space vehicle having a continuous rotation about a spin axis; first means sensing departure of the direction of the spin axis from a desired orientation; second means responsive to the direction and intensity of the magnetic field of the earth; and thrust producing means on said vehicle and jointly controlled by the first and second means for altering the attitude of the vehicle.

3. The apparatus of claim 2 wherein the thrust producing means generates its own magnetic field that reacts with the earth's magnetic field to alter craft attitude.

4. The apparatus of claim 3 wherein the second means comprise a magnetometer control that energizes the thrust producing means in a direction dependent upon the direction of the magnetic field of the earth.

5. The apparatus of claim 4 wherein the second means includes two two-position switches operable to one or the other operative position by the magnetometer in accordance with the direction of the earth's magnetic field.

6. In an earth orbiting space vehicle having a continuous rotation about a spin axis, stabilizing means for maintaining a desired attitude of the craft about two axes forming a plane perpendicular to the spin axis, means on said vehicle providing a magnetic field which reacts with components of the earth's magnetic field lying in said plane; and means jointly energizing said last named means including a magnetometer responsive to the direction and strength of the magnetic field of the earth and means responsive to change in direction of said spin axis.

7. In an earth orbiting space vehicle having a length and width considerably larger than its thickness and having a spin axis or rotational axis in the direction of its thickness and having attitude stabilizing means maintaining a desired orientation of the spin axis: means including current conducting elements forming magnetic torquing means by reacting with the earth's magnetic field to torque the vehicle about its spin axis, wherein the current conducting elements form a circular spin torquer comprising a number of turns of conductor wound around the diameter of the vehicle, magnetic shield means over half of each turn of the conductor, said diameter being in a plane formed by the two larger dimensions of the vehicle.

8. In an earth orbiting space vehicle having a length and width considerably larger than its thickness and having a spin axis or rotational axis in the direction of its thickness and having attitude stabilizing means maintaining a desired orientation of the spin axis; means including current conducting elements forming magnetic torquing means by reacting with the earth's magnetic field to torque the vehicle about its spin axis, wherein the current conducting elements form a tangential linear spin torquer comprising a number of turns of conductor wound around the diameter of the vehicle, each turn at its extremities having a linear portion parallel with the vehicle spin axis, magnetic shield means over half of each turn of the conductor, said diameter being in a plane formed by the two larger dimensions of the vehicle.

9. In an earth orbiting space vehicle having a spin axis about which the vehicle continuously rotates and two remaining axes respectively perpendicular and also perpendicular to the spin axis: attitude stabilizing means including attitude sensing means reacting with the earth's magnetic field in controlling the vehicle about said last two named axes for maintaining a desired orientation of the spin axis; and further means on said vehicle reacting with the earth's magnetic field for torquing the vehicle about its spin axis.

10. The apparatus of claim 9 wherein the torque for increasing the spin rate of the vehicle is provided in part at least by a component of the earth's magnetic field in the direction of the spin axis of the vehicle.

11. In an earth orbiting space vehicle having a rotational rate about its spin axis to thus provide an artificial gravity: attitude stabilizing means for controlling the attitude of the vehicle about two axes respectively perpendicular to the spin axis whereby to maintain a desired orientation of the spin axis, said attitude stabilizing means comprising means detecting error in orientation of the spin axis from a desired orientation, means detecting the direction of the magnetic field of the earth, and torquing means receiving current controlled by the means detecting error in orientation and the earth's field detecting means to develop a magnetic field interacting with the earth's magnetic field to maintain the desired orientation of the spin axis.

12. The apparatus of claim 11 and a vehicle spin torquer comprising electrical conductors energized from a suitable source and developing a magnetic field reacting with the earth's magnetic field to spin said vehicle.

13. The apparatus of claim 12 wherein said spin torquer consists of conductors about the vehicle at the diameter thereof in a plane of the vehicle at right angles to said spin axis.

14. The apparatus of claim 13 wherein said vehicle is generally in the shape of a toroid wherein the spin torquer is provided with shielding means for the portions of the conductors constituting the inner diameter of the toroid.

15. In a condition stabilizing apparatus for an earth orbiting space vehicle having a continuous rotation about a spin axis: first means sensing a change in a condition of the spin axis from a given condition; second means sensing the direction of the magnetic field of the earth; and thrust producing means on said vehicle jointly controlled by the first and second means.

16. The apparatus of claim 15 wherein the thrust producing means comprise current conducting members that provide a magnetic field interacting with the earth's magnetic field.

17. The apparatus of claim 16 wherein the second means alternates the direction of current through the thrust producing means every 180° rotation of the vehicle about the spin axis.

18. The apparatus of claim 15 wherein the first means senses angular rate of the vehicle about an axis perpendicular to the craft spin axis.

19. The apparatus of claim 18 wherein the first means reverses the direction of current flow in the torquing means in accordance with the apparent opposite direction of deviation rate due to the spinning of the vehicle.

20. In an earth orbiting space vehicle continuously spinning about one axis, control means for maintaining a desired spin rate, comprising: first means selecting a spin rate; second means detecting the vehicle spin rate, means algebraically combining the outputs from the first and second means; third means responsive to the earth's magnetic field; current conducting means; and switching means for closing a circuit to said current conducting means, said switching means being controlled by said combining means and said third means whereby the current conducting means reacts with the earth's magnetic field to alter the spin rate.

21. The apparatus of claim 20 wherein said switching means comprises a source of D.C. voltage for energizing said current conducting means.

22. The apparatus of claim 20 wherein the current conducting means comprises inductive means parallel to the vehicle spin axis which has a current induced therein by induction during passage of said orbiting vehicle through the magnetic field, upon operation of the switching means.

23. The apparatus of claim 22 wherein the circuit for the current conducting means is open during a portion of the spinning cycle of the vehicle.

24. In an earth orbiting space vehicle having a continuous rotation about a spin axis thereof: means responsive to the direction and intensity of the magnetic field of the earth; thrust producing means on said vehicle; and means controlling said thrust producing means from said magnetic field responsive means to interchange spin momentum and orbital momentum.

25. The apparatus of claim 24, and means detecting a change in the angular position of said vehicle from a desired position and coacting with the first named means for maintaining a desired position by interchange of spin momentum and orbital momentum.

References Cited by the Examiner
UNITED STATES PATENTS 3,048,351   8/1962   Donoho _____ 244—1
3,061,239   10/1962  Rusk _____ 244—1

OTHER REFERENCES

"Astronautics," September 1962, 244–1SS, pages 25–29.

FERGUS S. MIDDLETON, *Primary Examiner.*

RALPH D. BLAKESLEE, *Examiner.*